US009942935B2

(12) United States Patent
Gilbert et al.

(10) Patent No.: US 9,942,935 B2
(45) Date of Patent: Apr. 10, 2018

(54) SYSTEM AND METHOD FOR PROVIDING A WIRELESS FAILOVER OF A MANAGEMENT CONNECTION IN A SERVER RACK OF A DATA CENTER

(71) Applicant: Dell Products, LP, Round Rock, TX (US)

(72) Inventors: Matthew Bryan Gilbert, Austin, TX (US); Hana Schuster Smith, Austin, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 196 days.

(21) Appl. No.: 14/943,689

(22) Filed: Nov. 17, 2015

(65) Prior Publication Data
US 2017/0142769 A1    May 18, 2017

(51) Int. Cl.
| | |
|---|---|
| H04L 12/28 | (2006.01) |
| H04W 76/02 | (2009.01) |
| H04L 12/24 | (2006.01) |
| H04W 76/06 | (2009.01) |
| H04L 29/14 | (2006.01) |
| H04W 12/06 | (2009.01) |
| H04L 29/06 | (2006.01) |

(52) U.S. Cl.
CPC ....... *H04W 76/025* (2013.01); *H04L 41/0206* (2013.01); *H04L 41/0803* (2013.01); *H04L 63/0428* (2013.01); *H04L 69/40* (2013.01); *H04W 12/06* (2013.01); *H04W 76/06* (2013.01)

(58) Field of Classification Search
CPC ........................................................ H04L 12/28
USPC ......................................................... 370/254
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersqard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |

(Continued)

*Primary Examiner* — Dang Ton
(74) *Attorney, Agent, or Firm* — Larson Newman, LLP

(57) ABSTRACT

A server rack includes a first component including a host processor to provide a hosted environment and a first management system to provide a managed environment separate from the hosted environment, to establish a first wireless connection to a mobile device, to process a first management request from the mobile device in the managed environment, and to detect that the first wireless connection has unexpectedly terminated, and a second component including a second management system to receive an indication from the first management controller that the first wireless connection was unexpectedly terminated, to establish a second wireless connection to the mobile device in response to the indication, to receive a second management request from the mobile device, and to send the second management request to the first management system. The first management system being further to process the second management request in the managed environment.

20 Claims, 13 Drawing Sheets

(56) References Cited

U.S. PATENT DOCUMENTS

| | | |
|---|---|---|
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |
| 6,131,119 A | 10/2000 | Fukui |
| 6,167,448 A | 12/2000 | Hemphill et al. |
| 6,282,175 B1 | 8/2001 | Steele et al. |
| 6,601,084 B1 | 7/2003 | Bhaskaran et al. |
| 6,654,347 B1 | 11/2003 | Wiedeman et al. |
| 6,714,977 B1 | 3/2004 | Fowler et al. |
| 6,826,714 B2 | 11/2004 | Coffey et al. |
| 7,450,636 B2 | 11/2008 | Lee et al. |
| 7,696,506 B2 | 4/2010 | Lung |
| 7,720,987 B2 | 5/2010 | Penk et al. |
| 8,031,763 B2 | 10/2011 | Sumesaglam |
| 8,037,330 B2 | 10/2011 | Livescu et al. |
| 8,588,288 B2 | 11/2013 | Witt |
| 8,732,508 B2 | 5/2014 | Cochran et al. |
| 2002/0095487 A1 | 7/2002 | Day et al. |
| 2002/0141210 A1 | 10/2002 | Glannopoulos et al. |
| 2003/0046339 A1 | 3/2003 | Ip |
| 2004/0010649 A1 | 1/2004 | Weaver et al. |
| 2004/0013188 A1 | 1/2004 | Tonietto et al. |
| 2006/0182172 A1 | 8/2006 | Lin |
| 2007/0094426 A1 | 4/2007 | Chiang et al. |
| 2007/0258508 A1* | 11/2007 | Werb ............ H04W 84/18 375/140 |
| 2008/0304557 A1 | 12/2008 | Hollis |
| 2008/0317021 A1 | 12/2008 | Ives et al. |
| 2009/0189774 A1 | 7/2009 | Brundridge et al. |
| 2009/0217073 A1 | 8/2009 | Brech et al. |
| 2009/0307515 A1 | 12/2009 | Bandholz et al. |
| 2010/0027687 A1 | 2/2010 | De Natale et al. |
| 2010/0106154 A1 | 4/2010 | Harlev et al. |
| 2011/0022245 A1 | 7/2011 | Goodrum et al. |
| 2011/0179301 A1 | 7/2011 | Liu et al. |
| 2012/0170638 A1 | 7/2012 | Chen |
| 2012/0262956 A1 | 10/2012 | DeHaven |
| 2012/0303767 A1 | 11/2012 | Renzin |
| 2013/0007249 A1 | 1/2013 | Wang et al. |
| 2013/0169314 A1 | 7/2013 | Choudhary et al. |
| 2014/0269881 A1 | 9/2014 | He et al. |
| 2014/0312953 A1 | 10/2014 | Song |

* cited by examiner

SYSTEM AND METHOD FOR PROVIDING A WIRELESS FAILOVER OF A MANAGEMENT CONNECTION IN A SERVER RACK OF A DATA CENTER

FIELD OF THE DISCLOSURE

This disclosure generally relates to information handling systems, and more particularly relates to a system and method for providing a wireless failover of a management connection in a server rack of a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
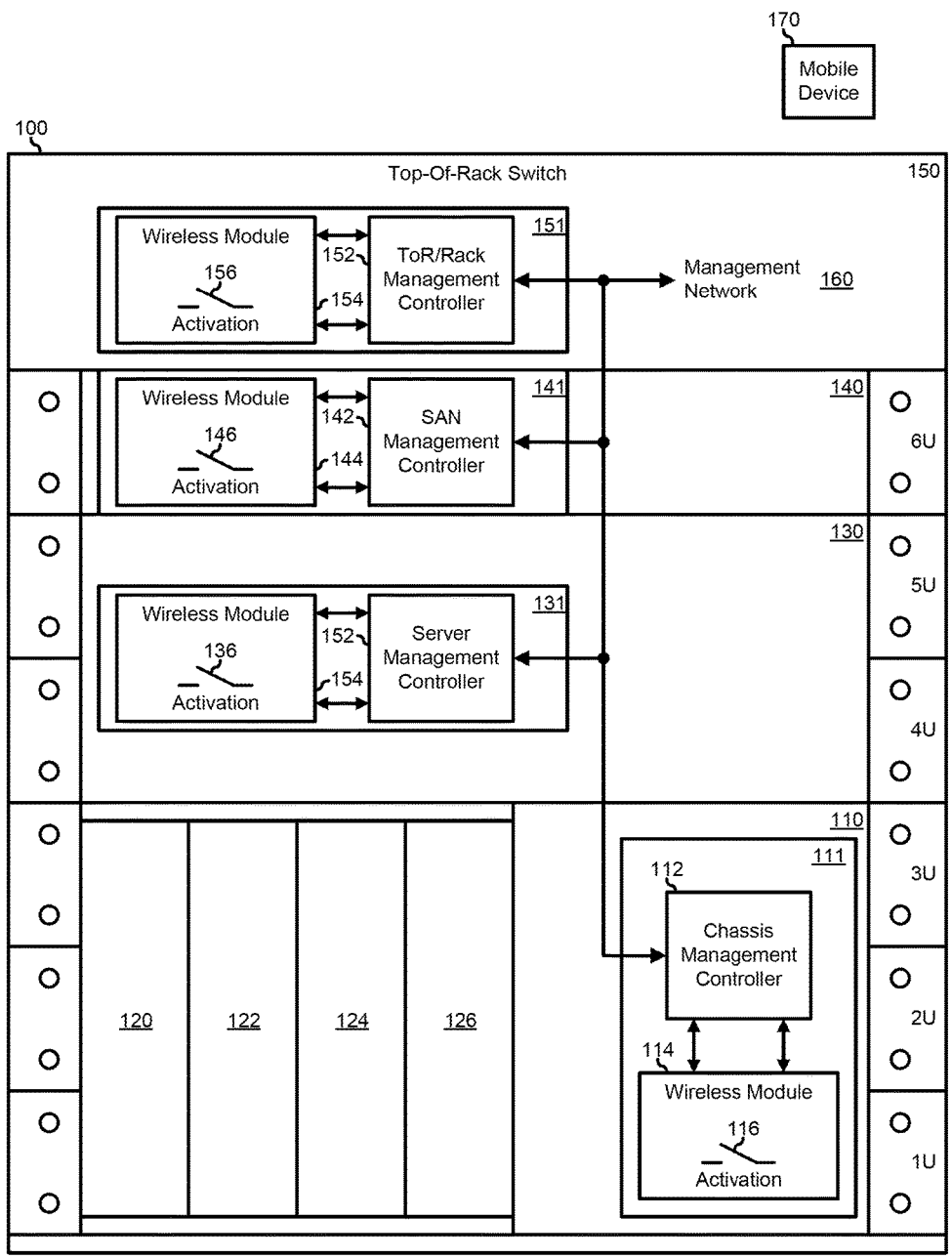
FIG. 1 is a view of a server rack according to an embodiment of the present disclosure.

FIG. 1 illustrates an embodiment of a server rack 100 including a blade chassis 110, a server 130, and storage 140 situated in a rack space of the server rack, and a top-of-rack (ToR) switch 150 at the top of the server rack. The rack space represents a standard server rack, such as a 19-inch rack equipment mounting frame or a 23-inch rack equipment mounting frame, and includes rack units, or divisions of the rack space that are a standardized unit of 1.75 inches high. For example, a piece of equipment that will fit an one of the rack units is referred to as a 1-U piece of equipment, another piece of equipment that takes up two of the rack units is referred to as a 2-U piece of equipment, and so forth. As such, the rack units are numbered sequentially from the bottom to the top as 1U, 2U, 3U, 4U, 5U, and 6U. The skilled artisan will recognize that other configurations for the rack units can be utilized as needed or desired. For example, a rack unit can be defined by the Electronic Components Industry Association standards council.

Blade chassis 110 represents a processing system of server rack 100 that is configured as a number of modular processing resources, or blades, that are provided in a common frame (i.e., the chassis). As such, blade chassis 110 includes server blades 120, 122, 124, and 126. Server 130 represents another processing system of server rack 100 that is configured as an individual processing resource. Storage 140 represents a data storage capacity of server rack 100 that provides a number of disk drives that are configured to the use of blade chassis 110 and of server 130, and can include other type of storage resource for server rack 100.

ToR switch 110 represents a network system of server rack 100, providing for high speed communications between blade chassis 110, server 130, storage 140, and a network (not illustrated). In particular, ToR switch 150 is connected to blade chassis 110, server 130, and storage 140 via a network fabric (not illustrated), to provide data routing between the elements.

Each element of server rack 100 includes a management system having a management controller and a wireless management module. As such, blade chassis 110 includes a chassis management system 111 with a chassis management controller 112 and a wireless management module 114, server 130 includes a server management system 131 with a server management controller 132 and a wireless management module 134, storage 140 includes a storage management system 111 with a storage management controller 142 and a wireless management module 144, and ToR switch 150 includes a ToR management system 151 that includes a ToR management controller 152 and a wireless management module 154. Each of wireless management modules 114, 134, 144, and 154 include a respective activation switch 116, 136, 146, and 156, and respective indicators 118, 138, 148, and 158, described further, below.

Management systems 111, 131, 141, and 151 are connected together via a management network 160 to provide for out-of-band monitoring, management, and control of the respective elements of server rack 100. For example, management systems 111, 131, 141, and 151 can provide system monitoring functions, such as temperature monitoring, power supply monitoring, physical intrusion monitoring, hot-swap and hot-plug monitoring, other monitoring functions that can be performed outside of a hosted environment of the respective elements of server rack 100, or other system monitoring functions as needed or desired. Management systems 111, 131, 141, and 151 can also provide system management and control functions for the respective elements of server rack 100, such as cooling fan speed control, power supply management, hot-swap and hot-plug management, firmware management and update management for system BIOS or UEFI, Option ROM, device firmware, and the like, or other system management and control functions as needed or desired. As such, management controllers 112, 132, 142, and 152 represent embedded controllers associated with the respective elements of server rack 100 that operate separately from a hosted processing environment of the respective elements. For example, management controllers 112, 132, 142, and 152 can include a baseboard management controller (BMC), an Integrated Dell Remote Access Controller (IDRAC), or another type of management controller as needed or desired. Further, management controllers 112, 132, 142, and 152 can operate in accordance with an Intelligent Platform Management Interface (IPMI) specification, a Web Services Management (WSMAN) standard, or another interface standard for embedded management systems, as needed or desired. The skilled artisan will recognize that management controllers 112, 132, 142, and 152 can include other circuit elements, devices, or sub-systems, such as an embedded controller, a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein.

Wireless management modules 114, 134, 144, and 154 operate to provide wireless connectivity between a user with a wireless enabled mobile device 170 and management network 160 through the respective management controllers 112, 132, 142, and 152. For example, wireless management modules 114, 134, 144, and 154 can include WiFi wireless interfaces in accordance with one or more IEEE 802.11 specifications for high-speed data communication between mobile device 170 and the wireless management modules, at speeds of up to 30 mega-bits per second (MBPS) or more. Wireless management modules 114, 134, 144, and 154 can also include Bluetooth wireless interfaces in accordance with one or more Bluetooth specifications, including Bluetooth Low Energy (BLE), also known as Bluetooth Smart (BTS), for lower-speed communications at speeds of up to 150 kilo-bits per second (Kbps) or more.

Wireless management modules 114, 134, 144, and 154 include various security features to ensure that the connection between mobile device 170 and management network 160 is secure and that the user of the mobile device is authorized to access the resources of the management network. In particular, wireless management modules 114, 134, 144, and 154 operate to provide various WiFi user and device authentication schemes, such as schemes that are in accordance with one or more IEEE 802.11 specifications, Service Set Identification (SSID) hiding, Media Access Control Identification (MAC ID) filtering to allow only pre-approved devices or to disallow predetermined blacklisted devices, Static Internet Protocol (IP) addressing, Wired Equivalent Privacy (WEP) encryption, WiFi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor specific user and device authentication schemes, as needed or desired. Further, wireless management modules 114, 134, 144, and 154 operate to provide various Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

In a particular embodiment, wireless management modules 114, 134, 144, and 154 also provide additional security features that further assure the user, device, and service security of the connection between mobile device 170 and management network 160. In particular, wireless management modules 114, 134, 144, and 154 each include an activation switch 116, 136, 146, and 156, respectively, that operate to enable the establishment of the connection between the mobile device and the wireless management modules. In this way, the establishment of the connection between mobile device 170 and wireless management modules 114, 134, 144, and 154 is predicated on the physical proximity of a user and of the user's mobile device to server rack 100, and also upon an action indicating a request to establish the connection. Here, a remote device and user would not be able to initiate an attack on management network 160 because of the lack of physical proximity to server rack 100 to activate activation switches 116, 136, 146, or 156, and so any attempt to attack management network would have to wait at least until a service technician activated one of the activation switches. In another embodiment, one or more of wireless management modules 114, 134, 144, and 154 and mobile device 170 operate to detect a Received Signal Strength Indication (RSSI) or a Received Channel Power Indication (RCPI) to permit the determination of the proximity between the mobile device and the wireless management modules, as described further, below. In a particular embodiment, one or more of wireless management modules 114, 134, 144, and 154 does not include an activation switch, and the particular wireless management modules provide for the establishment of the connection between the mobile device the wireless management modules in response to another activation request from the mobile device.

The elements of server rack 100, blade chassis 110, server 130, storage 140, and ToR switch 150 are exemplary, and more or fewer elements can be considered to be included in the server rack as needed or desired, and that other types of elements can be included in the server rack as needed or desired. Further, the management network of server rack 100 can include management controllers associated with more or fewer elements or different types of elements, and needed or desired.

Figure 2:
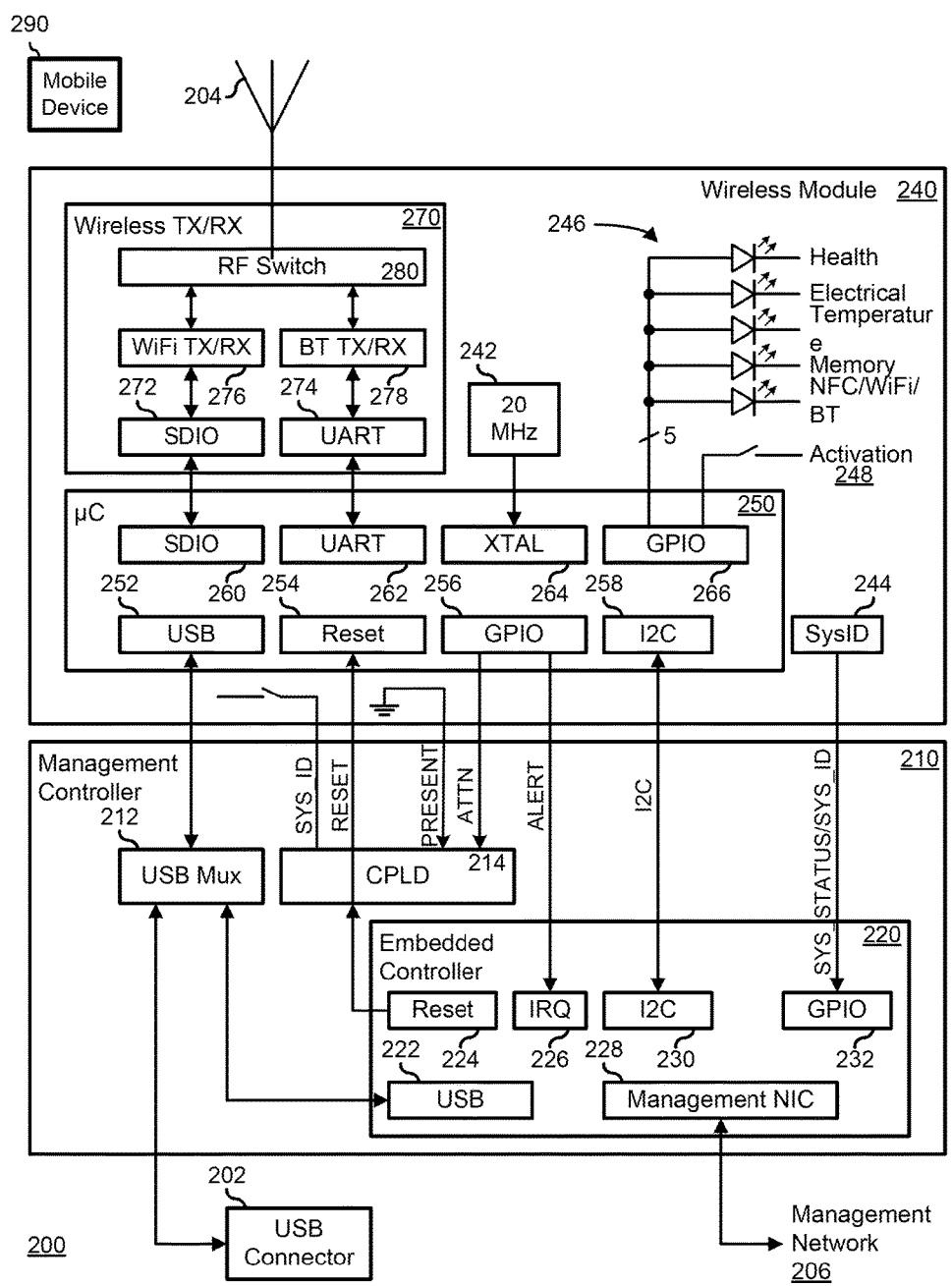
FIG. 2 is a block diagram illustrating a management system of the server rack of FIG. 1.

FIG. 2 illustrates a management system 200 similar to management systems 111, 131, 141, and 151, and includes a management controller 210 that is similar to management controllers 112, 132, 142, and 152, a wireless management module 240 similar to wireless management modules 114, 134, 144, and 154, a USB connector 202, a wireless device antenna 204, and a connection to a management network 206. Management controller 210 includes a USB multiplexor 212, a CPLD 214, and an embedded controller 220. Embedded controller 220 includes a USB interface 222, a reset function output 224, an interrupt request input 226, a management network interface device (NIC) 228, an Inter-Integrated Circuit (I2C) interface 230, and a General Purpose I/O (GPIO) 232.

Wireless management module 240 includes a 20 megahertz (MHz) crystal 242, a system ID module 244, indicators 246, an activation switch 248, a micro-controller 250, and a wireless transceiver module 270. Micro-controller 250 includes a USB interface 252, a reset function input 254, GPIOs 256 and 266, an I2C interface 258, a Secure Digital I/O (SDIO) interface 260, a Universal Asynchronous Receiver/Transmitter (UART) 262, and a crystal input 264. Wireless transceiver module 270 includes and SDIO interface 72, a UART 274, a WiFi transceiver 276, a Bluetooth transceiver 278, and a Radio Frequency (RF) switch 280. Management controller 210 and wireless management module 240 will be understood to include other elements, such as memory devices, power systems, and other elements as needed or desired to perform the operations as described herein. In a particular embodiment, wireless management module 240 is configured as a pluggable module that can be installed into management system 200, or not, as needed or desired by the user of a rack system that includes the management system. The skilled artisan will recognize that other configurations can be provided, including providing one or more element of management controller 210 or wireless management module 240 as a pluggable module, as elements on a main board of management system 200, or as integrated devices of the management system.

USB multiplexor 212 is connected to USB connector 202, and USB interfaces 222 and 252 to make a selected point-to-point USB connection. For example, a connection can be made between a USB device plugged in to USB connector 202 and embedded controller 220 by connecting the USB connector to USB interface 222. In this way, a device plugged in to USB connector 202 can access the management functions and features of the information handling system that is managed by management controller 210, and can access management network 206. Alternatively, a connection can be made between a USB device plugged in to USB connector 202 and micro-controller 250 by connecting the USB connector to USB interface 252. In this way, a device plugged in to USB connector 202 can access the management functions and features of wireless management module 240. For example, a technician in a data center can connect a laptop device to USB connector 202, configure USB multiplexor 212 to make a point-to-point connection to USB interface 252, and provide a firmware update for wireless management module 240. Finally, a connection can be made between embedded controller 220 and micro-controller 250 by connecting USB interface 222 to USB interface 222. In this way, a mobile device 290 that has established a wireless connection to wireless management module 240 can access the management functions and features of the information handling system that is managed by management system 200, the mobile device can access management network 206, and the management network can be used to access the management functions and features of the wireless management module or to provide a firmware update for the wireless management module. USB connector 202, USB multiplexor 212, and USB interfaces 222 and 252 can be configured in accordance with the USB Standard Revision 3.1, or with another USB Standard Revision, as needed or desired. In updating the firmware of wireless management module 240, micro-controller 250 operates to provide version retrieval, fail-safe updating, signature validation, and other operations needed or desired to perform the firmware update of the wireless management module. In a particular embodiment, management controller 210 does not include USB multiplexor 212, and USB interfaces 222 and 252 are directly connected together.

CPLD 214 represents a logic device for implementing custom logic circuitry to interface between various off-the-shelf integrated circuits, and particularly between embedded controller 220 and micro-controller 250. In particular, CPLD 214 operates to receive a system identification input (SYS_ID) from wireless management module 240, to receive the reset signal from reset function output 224, to forward the reset signal to reset function input 254, to receive a module present (PRESENT) signal from the wireless management module, and to receive an interrupt (INT) signal from GPIO 256. The SYS_ID can be provided based upon one or more settings, such as jumper settings, fusible links, register settings, or other settings, as needed or desired. In another embodiment, one or more functions of CPLD 214 is provided by embedded controller 220, or by micro-controller 250, as needed or desired.

Embedded controller 220 represents an integrated device or devices that is utilized to provide out-of-band management functions to the information handling system that includes management system 200, and can include a BMC, an IDRAC, or another device that operates according to the IPMI specification. In particular, embedded controller 220 operates to receive an interrupt alert (ALERT) signal from GPIO 258 on interrupt request input 230, to send and receive information between I2C 230 and I2C 258, and to receive system status information and system identification information (SYS_STATUS/SYS_ID) from system ID module 244.

Micro-controller 250 represents an embedded controller that operates to control the functions and features of wireless module 240, as described further, below. Micro-controller 250 operates to send and receive information between SDIO interface 260 and SDIO interface 272, to send and receive information between UART 262 and UART 274, to receive a crystal clock signal input from crystal 242, to provide control outputs from GPIO 266 to indicators 246, and to receive an activation input from activation switch 248 at GPIO 266. Indicators 246 provide visual indications of various statuses for wireless management module 240, including a health indication, a electrical/power indication, a temperature indication, a memory status indication, and a radio status indication that identifies the type of a mobile device that is connected to wireless management module, such as a WiFi device, a Bluetooth device, or a Near Field Communication (NFC) device. In a particular embodiment, micro-controller 250 provides other modes of communication between management controller 210 and wireless transceiver module 270, as needed or desired.

Wireless transceiver module 270 represents a mixed-signal integrated circuit device that operates to provide the radio signal interface to a mobile device 290 and to provide data interfaces to micro-controller 250. As such, wireless transceiver module 270 includes a WiFi channel that includes SDIO interface 272 and WiFi transceiver 276, and a Bluetooth channel that includes UART 274 and Bluetooth transceiver 278 that each are connected to RF switch 280. RF switch 280 switches antenna 204 to selectively provide WiFi communications or Bluetooth communications to mobile device 290. In a particular embodiment, wireless transceiver module 270 represents an off-the-shelf device to provide WiFi and Bluetooth wireless communications with mobile device 290.

Management controller 210 operates to provide management and configuration of wireless management module 240, such as by providing firmware updates, SSID configuration, WEP or WPA2 passwords, and the like. In interfacing with management controller 210, wireless management module 240 is represented as a composite USB device, and is connected as two different devices to the management controller. In operating with a WiFi connected mobile device, such as mobile device 290, management controller 210 instantiates a USB class NIC device driver, and the management controller treats the wireless management module in accordance with an Ethernet Remote Network Driver Interface Specification (RNDIS), a USB Communication Device Class (CDC) device, a USB NIC, or another USB network class device. Thus, as viewed from management controller 210, wireless management module 240 operate as a USB NIC, and as viewed from mobile device 290 the wireless management module operates as a WiFi class device, as described further below.

In operating with a Bluetooth connected mobile device, such as mobile device 290, management controller 210 acts as a Bluetooth Host Controller, using a Host Controller Interface (HCI) protocol to communicate with wireless management module 240 via a serial port (UART). In another embodiment, wireless management module 240 is viewed by management controller 210 as a Bluetooth dongle. Thus, as viewed from management controller 210, wireless management module 240 operate as a USB CDC, and as viewed from mobile device 290 the wireless management module operates as a Bluetooth device, as described further below.

Wireless management module 240 operates to deactivate one or more of the WiFi stack and the Bluetooth stack in response to a timeout event. As such, micro-controller 250 can include a timer that determines if a connected device has gone dormant or otherwise ceased to interact with management system 200, such as when mobile device 290 has moved out of range of wireless management module 240. Here, wireless management module 240 can suspend the connected session with the mobile device, and no new session will be initiated until activation switch 248 is activated to indicate that a new session is requested. For example, when a user who is connected using mobile device 290 with management system 200, but subsequently walks away from a server rack that includes the management system, wireless management module 240 can automatically detect the time that the connection is idle, and, after a predetermined duration, can shut down the connection and suspend all wireless activity until a new session is requested. Further, wireless management module 240 operates such that a selected one or both of the WiFi stack and the Bluetooth stack can be disabled. In a particular embodiment, wireless management module 240 operates to configure the transmission power level of the WiFi channel and of the Bluetooth channel.

Mobile device 290 represents a wireless communication enabled device, such as a tablet device, a laptop computer, a smart phone, and the like, that is configured to interact with management system 200 via a wireless connection to wireless management module 240. In particular, mobile device 290 can include a mobile operating system (OS), such as an Android OS, an iOS, a Windows mobile OS, or another mobile OS that is configured to operate with the hardware of the mobile device. As such, the hardware of mobile device 290 can include Android-enabled hardware, iOS-enabled hardware, Windows-enabled hardware, or other hardware, as needed or desired.

Figure 3:
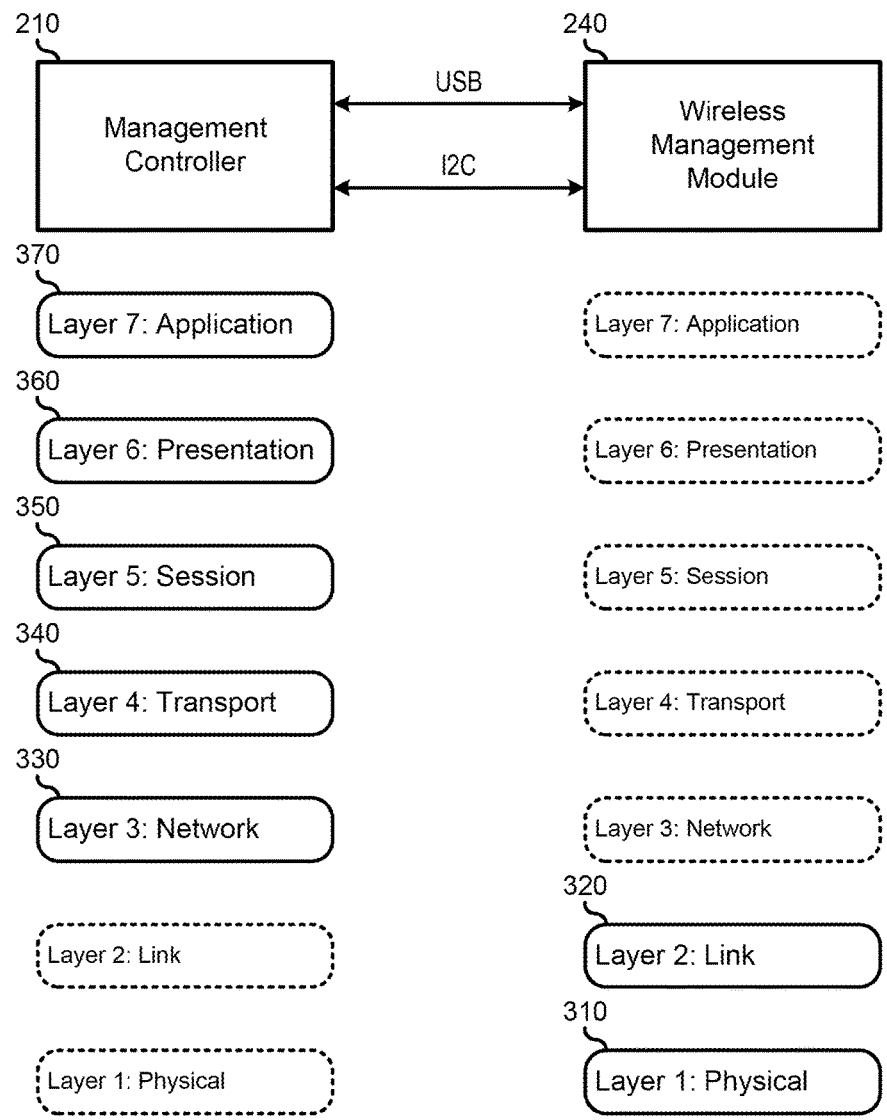
FIG. 3 is an illustration of an OSI layer arrangement of the management system of FIG. 2.

FIG. 3 illustrates management system 200, including the stack up of an Open Systems Interconnection (OSI) communication model layer arrangement for the management system. Here, the physical layer (L1) 310 and the link layer (L2) 320 are included in the functionality of wireless management module 240, and the network layer (L3) 330, the transport layer (L4) 340, the session layer (L5) 350, the presentation layer (L6) 360, and the application layer (L7) 370 are included in management controller 210.

Figure 4:
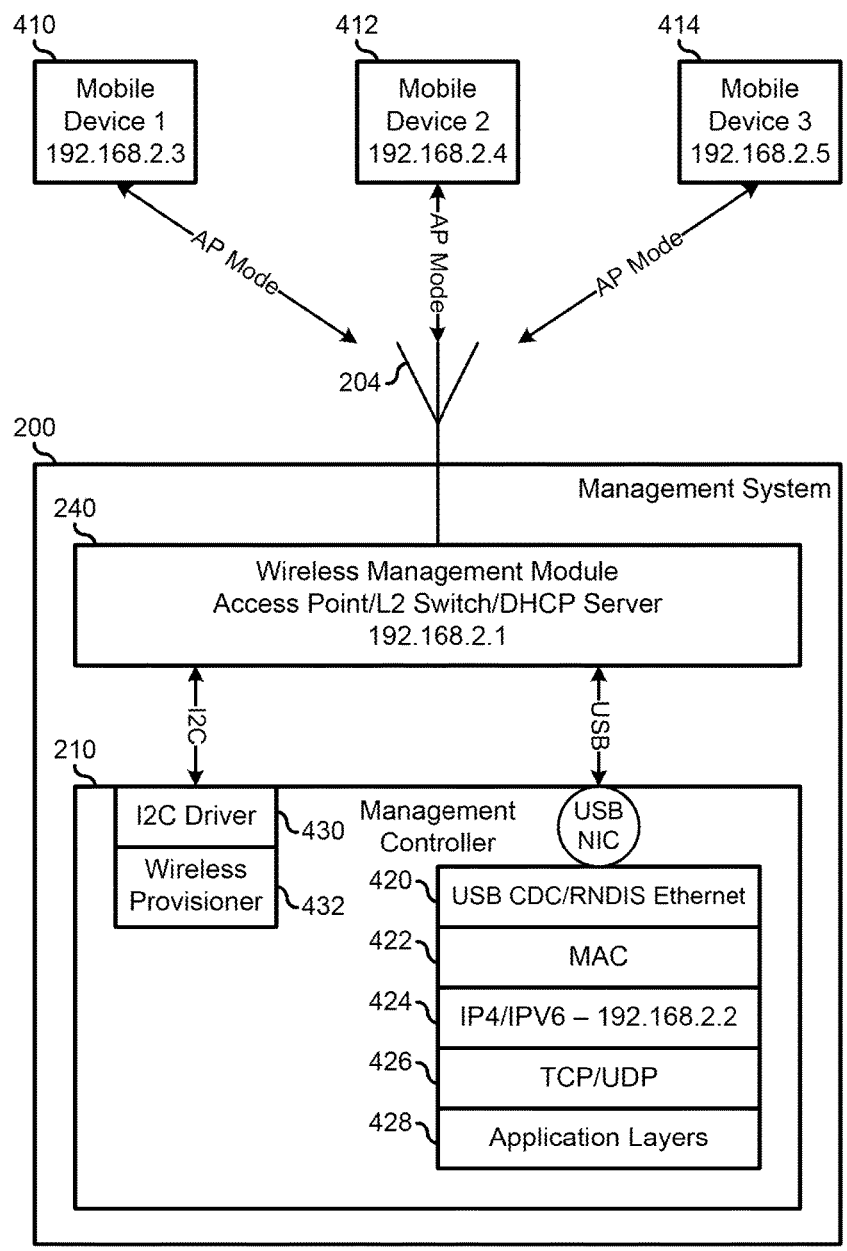
FIGS. 4 and 5 are block diagrams of various embodiments of wireless WiFi-based management networks on the management system of FIG. 2.

FIG. 4 illustrates an embodiment of a wireless WiFi-based management network 400 on management system 200. Here, wireless management module 240 presents itself to management controller 210 as a USB COM port functionality, and the management controller is illustrated as providing a USB NIC functionality by including a RNDIS class driver 420, a MAC address 422, an IP address 424 (192.168.2.2), a Transmission Control Protocol (TCP) and User Datagram Protocol (UDP) layer 426, and an application layer 428. Management controller 210 is also illustrated as providing an I2C interface including an I2C driver 430 and a wireless provisioner 432. Note that the IP address can be an IP version 4 (IP4) address, as illustrated, or an IP version 6 (IPV6) address, as needed or desired. Wireless management module 240 operates independently from management controller 210 in establishing and maintaining WiFi-based management network 400.

In establishing WiFi-based management network 400, wireless management module 240 is configured as a wireless access point that allows multiple mobile devices to be connected to management system 200. As such, management system 200 is illustrated as being connected with mobile devices 410, 412, and 414. Wireless management module 240 provides WiFi security functionality to mobile devices 410, 412, and 414, such as by screening the WIFI SSID so that only mobile devices that are aware of the existence of the wireless management module can be provide a request to be connected, by providing a key secured establishment of the connection, by encrypting communications between the mobile devices and the wireless management module using WEP, WPA, WPA2, or another encryption protocol, by providing other security assurance functions and features, or a combination thereof.

In addition, wireless management module 240 operates as a Dynamic Host Configuration Protocol (DHCP) host that provides a unique IP address to connected mobile devices 410, 412, and 414, the wireless management module can establish the connections with the mobile devices based upon static IP addresses of the mobile devices, or the wireless management module can provide a sub-network using a combination of DHCP-provided IP addresses and static IP addresses, as needed or desired. Further, wireless management module 240 views management controller 210 as a separate IP endpoint and can provide the management controller with a DHCP-provided IP address or the management controller can include a static IP address as needed or desired. In another embodiment, management controller 210 operates as a DHCP host that provides IP addresses to connected mobile devices 410, 412, and 414. In a particular embodiment, the DHCP host operates in accordance with the DHCPv6 specification, in a stateless auto-configuration mode, or another IP protocol.

Further, wireless management module 240 operates as a Layer-2 switch that redirects packets on the sub-network to the targeted endpoints. As such, mobile devices 410, 412, and 414, wireless management module 240, and management controller 210 can communicate with each other on the sub-network provided by the wireless management module. Also, wireless management module 240 operates to distribute gateway information to mobile devices 410, 412, and 414, and to management controller 210. Further, wireless management module 240 supports blacklisting and whitelisting of specific IP addresses that request access to management system 200.

In a particular embodiment, management controller 210 operates to provide various configuration information to wireless management module 240 via wireless provisioner 432, which tunes and controls the behavior of the wireless management module over the I2C bus. As such, management controller 210 can provide SSIDs, security keys, gateway addresses, and other configuration information, to wireless management module 240 via one of USB interfaces 212 and 252, and I2C interfaces 230 and 258. Here, because USB interfaces 212 and 252 and I2C interfaces 230 and 258 are within a server rack, and thus are deemed to be secure, wireless management module 240 does not need to employ additional security measures in accepting such configuration information from management controller 210. In another embodiment, wireless management module 240 receives the various configuration information from one or more of mobile devices 410, 412, and 414. Here, because a connection between wireless management module 240 and mobile devices 410, 412, and 414 is less secure than the connection to management controller 210, the wireless management module includes a management mode that is accessed via additional security and authentication functions and features in order to ensure that the users of the mobile devices are authorized to make such configuration modifications. For example, the management mode can be accessed via an additional username and password verification, via a hardware device authentication, or another mechanism for providing security and authentication, as needed or desired. In another embodiment, communications between management controller 210 and wireless management module 250 is conducted by other communication interfaces than USB interfaces 212 and 252, and I2C interfaces 230 and 258, as needed or desired.

A method of providing WiFi-based management network 400 on management system 200 includes powering on the management system, and determining that wireless management module 240 is installed into the management system. If wireless management system 240 is installed, then management controller 210 issues a DHCP request to connect to the access point that is established on the wireless management module. Wireless management module 240 assigns an IP address (192.168.2.2) to management controller 210 that is in the same sub-network as the access point (192.168.2.1). Next, mobile device 410 issues a DHCP request to connect to the access point and wireless management module 240 assigns an IP address (192.168.2.3) to the mobile device. Similarly, mobile devices 412 and 414 issue DHCP requests to connect to the access point and wireless management module 240 assigns IP addresses (192.168.2.4 and 192.168.2.5) to the mobile devices. In this way, management controller 210, wireless management module 240, and mobile devices 410, 412, and 414 can communicate over the sub-network with each other.

Figure 5:
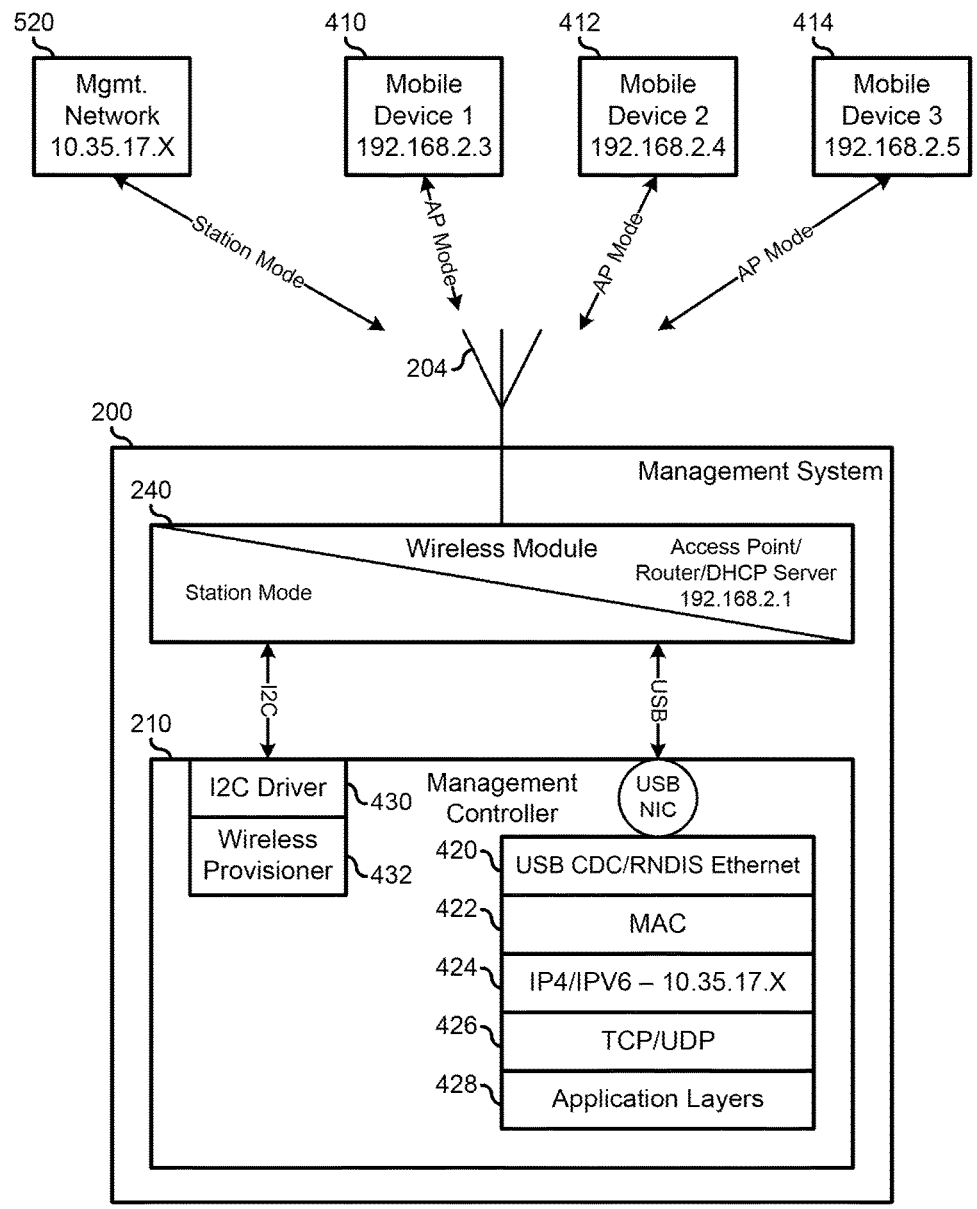

FIG. 5 illustrates another embodiment of a wireless-based management network 500 on management system 200. WiFi based management network 500 includes the functions and features of WiFi based management network 400, where wireless management module 240 operates in an access point mode to form a sub-network with mobile devices 410, 412, and 414. In addition to establishing WiFi-based management network 400, wireless management module 240 is configured as a wireless base station that permits the wireless management module to connect to a wireless management network 520 on a different sub-network. In the wireless base station mode, wireless management module 240 operates as a wireless client to wireless management network 520, such that the wireless management module operates to provide a DHCP request and authentication credentials to the wireless management network, and is authenticated by the wireless management network. Here, wireless management module 240 operates as a router that permits mobile devices 410, 412, and 414, and management controller 210 to communicate with wireless management network 520. In another embodiment, management controller 210 operates as the router, as needed or desired.

In a particular embodiment, management controller 210 is established as a node on wireless management network 520. Here, in one case, management controller 210 can be initially connected to, and established as a node on management network 520 through wireless management module 240, and then the wireless management module can establish the access point sub-network with mobile devices 410, 412, and 414. In another case, wireless management module 240 can establish the access point sub-network with mobile devices 410, 412, and 414, and management controller 210, as described above. Then, management controller 210 can perform a USB disconnect and a USB reconnect to wireless management module 240, and can send a DHCP request and authentication credentials to wireless management network 520 to obtain an IP address that is on the sub-network of the wireless management network.

A method of providing WiFi-based management network 500 on management system 200 includes the method for providing WiFi-based management network 400, as described above. After management controller 210, wireless management module 240, and mobile devices 410, 412, and 414 are established on the first sub-network, the management controller directs the wireless management module 240 to operate in a concurrent access point and base station mode. Wireless management module 240 then disconnects from the USB interface and reconnects to the USB interface with management module 210, and the management module sends SSID and authentication information to the wireless management module. Wireless management module 240 then sends a DHCP request and the authentication information to wireless management network 520. Wireless management network 520 sends an IP address (10.35. 17.X) to management controller 210 and authenticates the management controller onto the new sub-network. Here, because wireless management module 240 operates as a router, mobile devices 410, 412, and 414 can also communicate with wireless management network 520.

Figure 6:
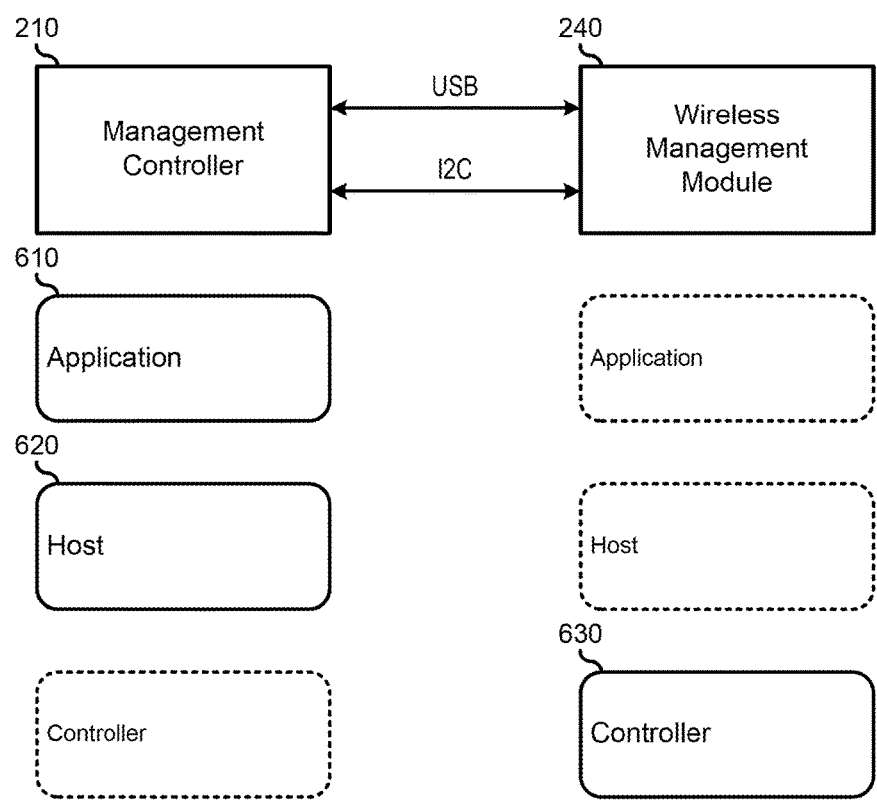
FIG. 6 is an illustration of a Bluetooth stack arrangement of the management system of FIG. 2.

FIG. 6 illustrates management system 200, including the stack up of a Bluetooth communication arrangement for the management system. Here, the application 610 and the host 620 are included in the functionality of management controller 210, and the controller 630 is included in the functionality of wireless management module 240.

Figure 7:
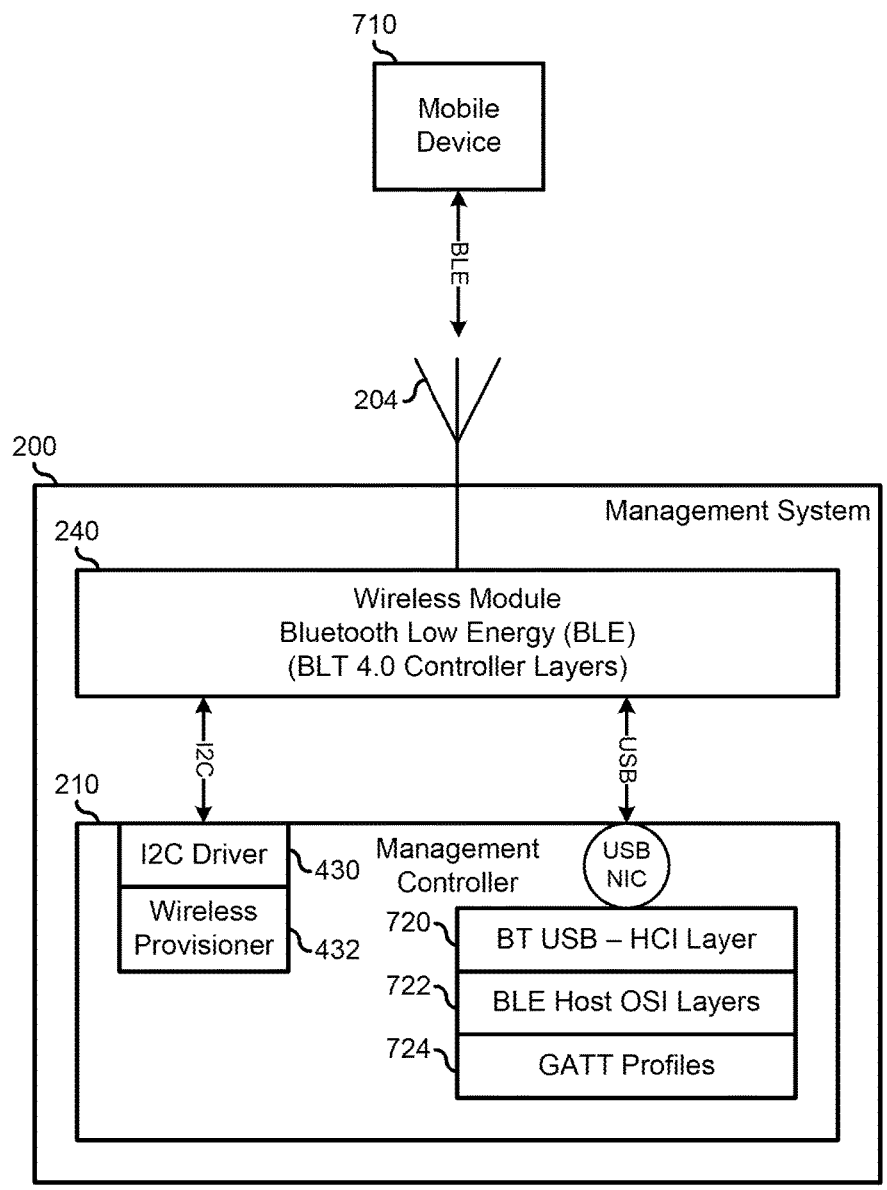
FIG. 7 is a block diagram of a wireless Bluetooth-based management network on the management system of FIG. 2.

FIG. 7 illustrates an embodiment of a wireless Bluetooth-based management network 700 on management system 200. Here, wireless management module 240 presents itself to management controller 210 as a USB COM port functionality, and the management controller is illustrated as providing a USB NIC functionality by including a Bluetooth USB-HCI layer 720, Bluetooth Low Energy (BLE) host OSI layers 722, and Bluetooth Generic Attribute Profiles (GATT) 724. Management controller 210 is also illustrated as providing I2C driver 430 and wireless provisioner 432, which tunes and controls the behavior of the wireless management module over the I2C bus. Wireless management module 240 operates independently from management controller 210 in establishing and maintaining Bluetooth-based management network 700.

In establishing Bluetooth-based management network 700, wireless management module 240 is configured as a Bluetooth controller in accordance with a Bluetooth Core Specification, and can connect a single mobile device 710 to management system 200. Management controller 210 operates to provide and maintain the BLE beacon data, content, and pass keys in wireless management module 240, and directs the wireless management module to change between operating modes, such as an advertising mode, a scanning mode, a master mode, a slave mode, or another operating mode, as needed or desired. In a particular embodiment, wireless management module 240 operates to configure the transmission power level of the Bluetooth channel, and supports RSSI and RCPI reporting on the incoming signal from mobile device 710. Further, wireless management module 240 supports blacklisting and whitelisting of specific mobile devices that request access to management system 200, such as by identifying a particular MAC address, IP address, International Mobile-station Equipment Identity (IMEI), Mobile Equipment Identifier (MEID), or other unique identifier for a mobile device.

Figure 10:
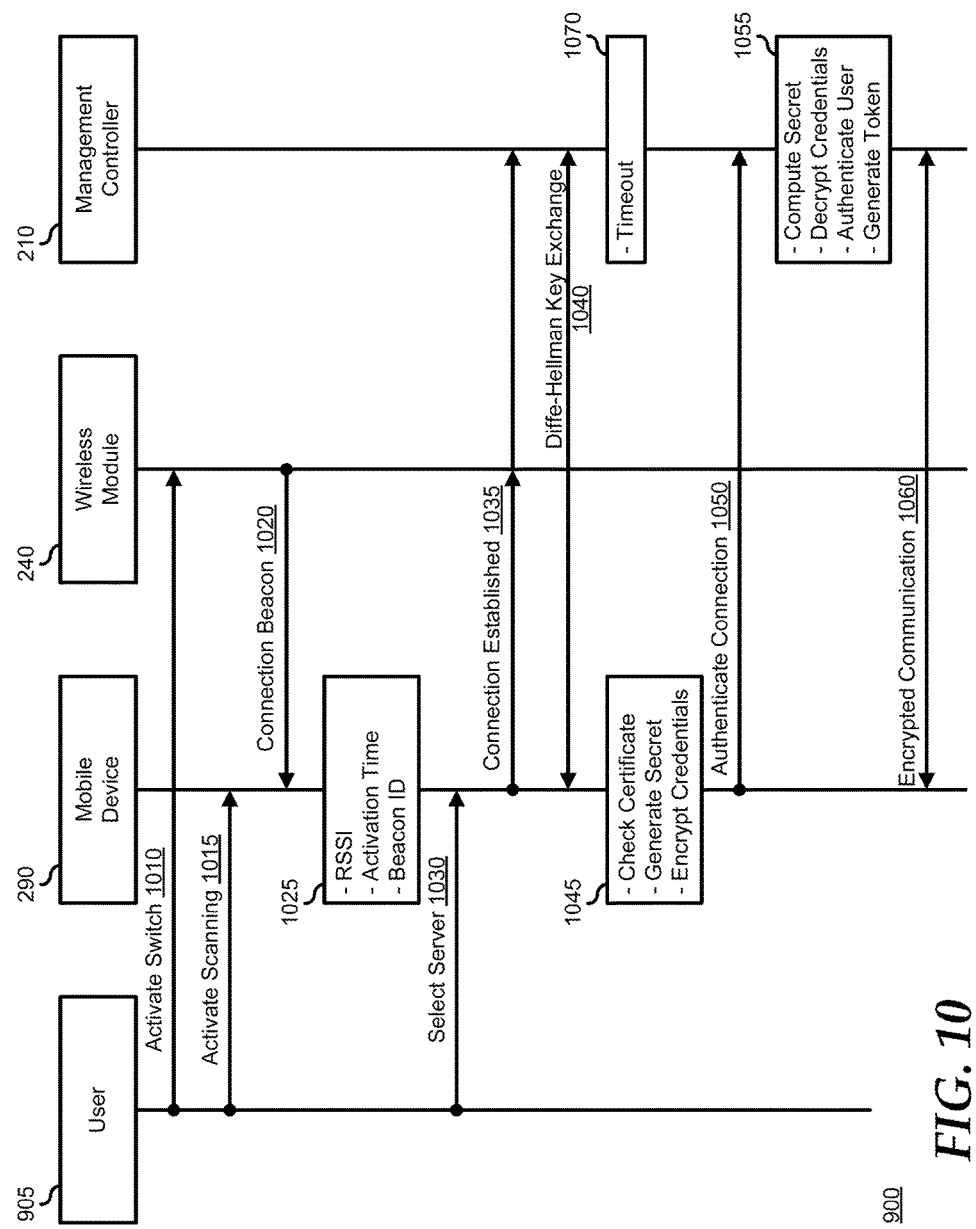
FIG. 10 is a lane diagram illustrating a method for securing a wireless device connection on the management system of FIG. 2.

FIG. 10 illustrates a method 1000 for securing a wireless device connection on management system 200. In a particular embodiment, the connection between a mobile device and a management system, as described herein, is a Bluetooth connection. At 1010, user 1005 activates activation switch 248 on wireless management module 240 to indicate that the user intends to connect mobile device 290 to management system 200. In a particular embodiment, wireless transceiver module 270 is powered off prior to the user 1005 activating activation switch 248. At 1015, user 1005 activates a wireless connection scanning mode on the mobile device to detect the presence of a beacon from wireless transceiver 270. For example, mobile device 290 can include an application, a widget, or another user interface (UI) (hereinafter referred to as just an application) that initiates a scanning mode on the mobile device. Here, the application can be configured to whitelist particular beacons of wireless management systems to which the mobile device is authorized to connect, and to blacklist beacons of other wireless management systems to which the mobile device is not authorized to connect.

At 1020, wireless management module 240 provides a connection beacon to mobile device 290 in response having activation switch 248 activated by the user. The connection beacon includes information that identifies management system 200 to mobile device 290. For example, the connection beacon can include device identification or model information, device health information, blacklist information for correlation with the identification of mobile device 290, or other information that may be needed or desired in establishing a connection between the mobile device and management system 200. Mobile device 290 receives the connection beacon and the associated information, and, at 1025, processes the information to provide a depiction of the device associated with wireless management module 240. In a particular embodiment, mobile device 290 displays the device identification or model in the UI. Further, mobile device 290 detects the RSSI or RCPI, and displays the information in the UI by correlating the device associated with the beacon with a relative location of the device, such that the user of the mobile device can readily identify the physical device based upon the relative location information. This may be particularly useful where, as in server rack 100 of FIG. 1, multiple devices all include management systems that each have a wireless management module. Here, user 1005 can hold mobile device 290 into a closest proximity to the device for which the user activated the activation switch. In this way, if multiple devices of the server rack are all providing beacons, the user can select the device that is associated with the closest proximate beacon. Here, further, wireless management module 240, and each other wireless management module in server rack 100 can be configured to provide their respective beacons at a pre-determined power level (i.e., a low power level) in order to facilitate the ability of the application to show the relative location information.

At 1030, user 1005 then selects management system 200 from among a number of displayed management systems, to which the user desires to be connected, and enters authentication credentials, such as a username/password combination, that is associated with management system 200, in order to authenticate the user onto the management system. In a particular embodiment, where a default username/password combination is provided, such as to access default accessible functions and features of management system 200, the application on mobile device 290 can prompt user 1005 to enter additional authentication information, such as a service tag for the device that the user desires to be connected to. In this way, additional physical security is introduced into the method, since a remote attacker will not have physical access to the device, for example to input, scan, or otherwise enter the additional authentication information, and thus would be not have access to the service tag number listed on the or device. In another embodiment, where mobile device 290 has previously been connected to management system 200, the authentication information is stored by the mobile device, such that user 1005 does not need to re-enter the authentication information, but the authentication information is provided directly by the mobile device.

At 1035, in response to user 1005 selecting management system 200, mobile device 290 establishes a connection to the management system. In a particular embodiment, the connection is established between mobile device 290 and wireless management module 240, and through to management controller 210. At 1040, management controller 210 provides key parameters, a certificate, and a signature to mobile device 290 in accordance with a Diffie-Hellman key exchange. At 1045, mobile device 290 checks the certificate, verifies the signature based upon the certificate, and generates a shared secret based upon the verified signature. Mobile device 290 then encrypts a payload using the shared secret, and, at 1050, the mobile device sends the encrypted payload to management controller 210. The payload includes a connection request, the authentication information provided by user 1005 or by mobile device 290, a digital signature, and other client certificate information if needed or desired. In a particular embodiment, matching certificates are pre-loaded onto management controller 210 and on mobile device 290 in order to provide an additional layer of security to the connection between the management controller and the mobile device.

At 1055, management controller 210 receives the encrypted payload, computes the shared secret, decrypts the payload using the shared secret, and authenticates the authentication information. In a particular embodiment, management controller 210 includes an authentication data base and is thus able to perform the authentication on its own. In another embodiment, management controller 210 access a remote certification authority to authenticate the provided authentication information. For example, management network 206 can include a certification authority, or can provide Internet access to a web-based certification authority, as needed or desired. at 1060, when user 1005 and mobile device 290 are authenticated, encrypted communication is established between the mobile device and management controller 210. In a particular embodiment, both transport layer information and application layer information are encrypted.

In a particular embodiment, at 1070, when the Diffie-Hellman key exchange is initiated, management controller 210 starts a timer to provide a timeout function, such that, if user 1005 and mobile device 290 are not authenticated within a predetermined amount of time, the connection is dropped. Here, where repeated attempts to authenticate user 1005 and mobile device 290 similarly fail, management controller 290 can include an attempt counter, such that, if the number of failed attempts exceeds a pre-determined number, the mobile device is added to a blacklist. In this way, attempts to hack into management system 200 can be singled out and blocked. The addition to the blacklist can be permanent or temporary. Where the addition to the blacklist is temporary, mobile device 290 can be removed from the blacklist automatically after a predetermined amount of time has lapsed. In another embodiment, where wireless management module 240 experiences greater than a pre-determined number of failed authentication attempts, the wireless management module shuts off wireless transceiver module 270 for a time to discourage hacking attempts.

In a particular embodiment, the functions and features related to the authentication of user 1005 and of mobile device 290, as described above, are performed by wireless management module 240 without necessitating the involvement of management controller 210. The skilled artisan will recognize that a similar method, as related to securing a wireless device connection on management system 200, where the connection is a WiFi connection, can be performed as needed or desired, and that the functions and features of the method as described herein are not necessarily applicable to only a Bluetooth connection.

Figure 11:
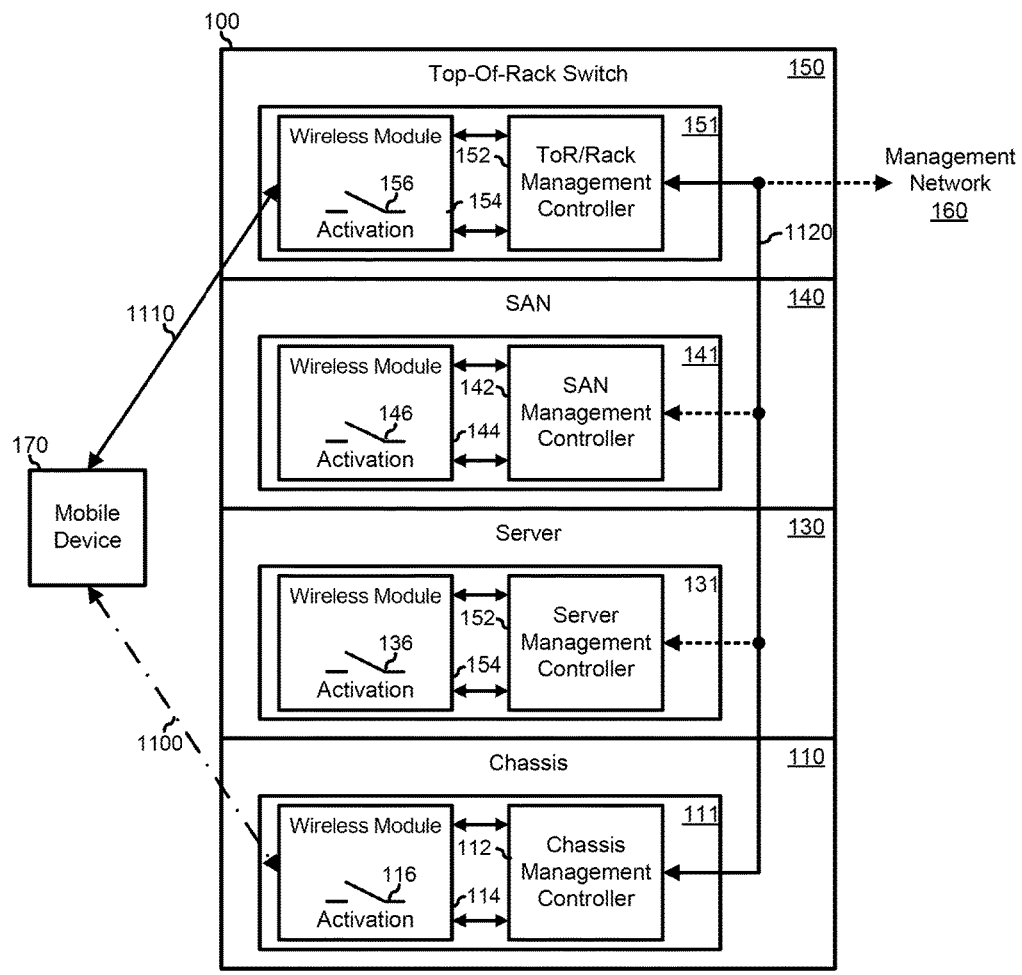
FIGS. 11-13 are views of the management network of FIG. 1, and showing methods for providing wireless failover of management connections in the server rack according to various embodiments of the present disclosure.

FIG. 11 illustrates an embodiment for establishing a management network on server rack 100 of FIG. 1, and for providing wireless failover of management connections in the server rack. Here, mobile device 170 has established a wireless connection 1100 with chassis management system 111 via wireless management module 114, as described above. Wireless connection 1100 can include a WiFi connection or a BLE connection, as needed or desired. At some point in time after establishing wireless connection 1100, the wireless connection is unintentionally broken, as indicated by the dashed line. For example, one or both of wireless management module 114 or mobile device 170 can have failed to transmit information to the other element, can have failed to receive information from the other element, or can have otherwise failed to maintain the wireless connection 1100.

Here, in a particular embodiment, wireless management module 114 detects the loss of wireless connection 1100 before mobile device 107 detects the loss of the wireless connection. Wireless management module 114 provides an indication to chassis management controller 112 that the wireless connection has been lost, and the chassis management controller is configured to communicate to ToR management system 151 that wireless connection 1100 has been lost. When ToR management system 151 receives the communication that wireless connection 1100 has been lost, the ToR management system directs wireless management module 154 to establish a wireless connection 1110 with mobile device 170, and ToR management system 151 stands as proxy for communications between mobile device 170 and chassis management system 111 via wired connection 1120. In particular, wireless management module 154 provides a proxy connection beacon that includes device identification or model information that is associated with chassis 110, and indicating that ToR management system 151 is providing the connection beacon as proxy for chassis management system 110. In a particular embodiment, when mobile device 170 receives the proxy connection beacon, the mobile device can be reauthenticated onto ToR management system 151 as described above with respect to FIG. 10. In another embodiment, when chassis management controller 112 communicates to ToR management system 151 that wireless connection 1100 has been lost, the communication can include a shared secret as determined by the authentication method described above with respect to FIG. 10. Here, the reauthentication process between mobile device 170 and ToR management system 151 can be abbreviated and communication can proceed using the shared secret that was determined between the mobile device and chassis management system 111.

Note that wireless connection 1100 can be unintentionally lost, such as described above, or the wireless connection can be intentionally lost, such as when a user of mobile device 170 establishes a different wireless connection to another element of server rack 100 or with another element of another server rack, or when the user of the mobile device moves beyond the effective range of the radio transceivers either of the mobile device or of wireless management module 114. In a particular embodiment, when wireless connection 1100 was intentionally lost, mobile device 170 provides a response to the proxy connection beacon indicating that the mobile device does not intend to reestablish wireless connection 1110, and wireless management module 154 discontinues the broadcasting of the proxy connection beacon, so as to limit the exposure to unauthorized connection attempts. In another embodiment, when wireless connection 1100 was intentionally lost, mobile device 170 ignores the proxy connection beacon, and wireless management module 154 is configured to provide the proxy connection beacon for only a short duration, so as to limit the exposure to unauthorized connection attempts. In yet another embodiment, when wireless connection 1100 was intentionally lost due to mobile device 170 establishing a different wireless connection to another element of server rack 100 or with another element of another server rack, the management system of the other element communicates the fact that the mobile device has established the different wireless connection to ToR management system 151 via management network 160, and wireless management module 154 is directed to cease providing the proxy connection beacon.

Figure 12:
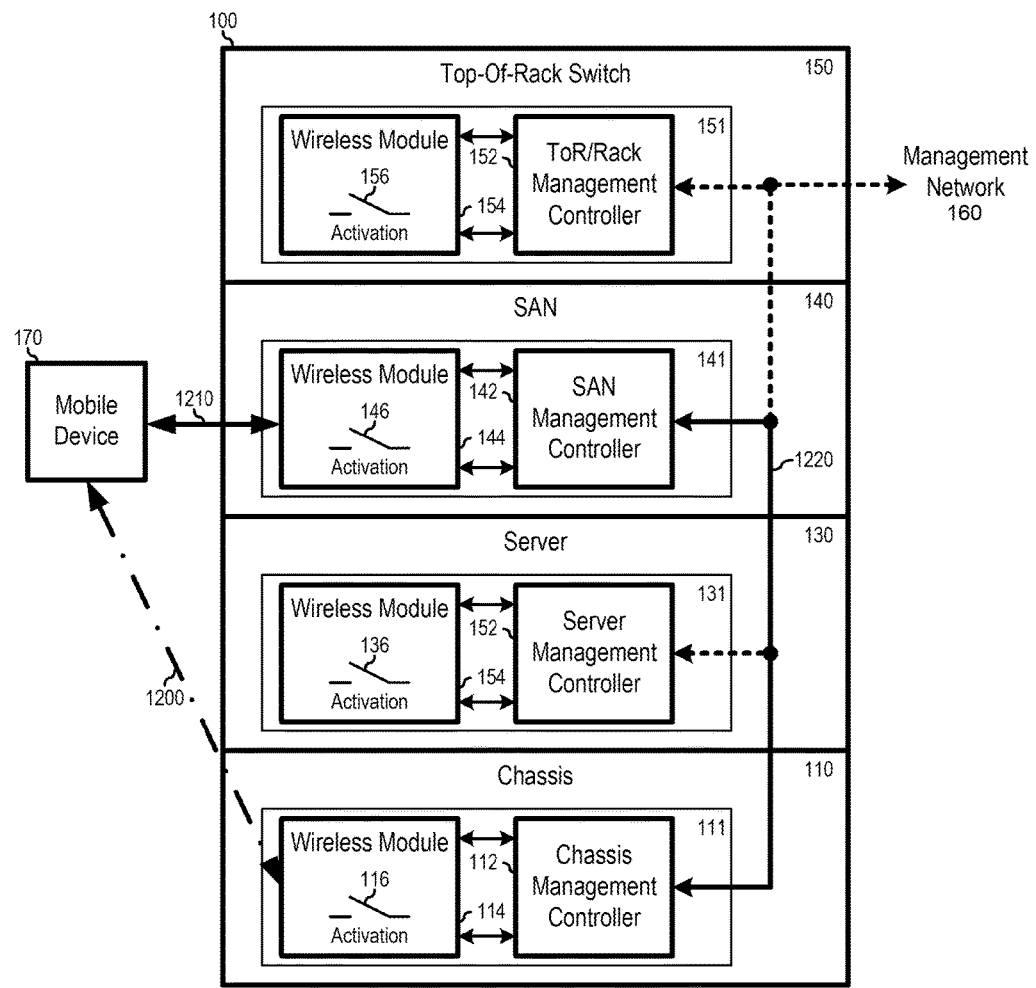

FIG. 12 illustrates another embodiment for establishing a management network on server rack 100 of FIG. 1, and for providing wireless failover of management connections in the server rack. Here, mobile device 170 has established and subsequently lost a wireless connection 1200 with chassis management system 111 via wireless management module 114, as described above. Rather than maintaining ToR management module 151 as a default element for reestablishing a wireless connection, a management system that is in closest proximity to mobile device 170, here illustrated as SAN management system 141, operates to reestablish wireless connection 1210 between the mobile device and wireless management module 144, and to stand as proxy for communications between the mobile device and chassis management system 111 via wired connection 1220. Here, all of management systems 131, 141, and 151 receive the indication from management system 111 that wireless connection 1200 was lost, and are configured to provide a proxy connection beacon. In this case, mobile device 170 is configured to accept the connection beacon that is associated with the strongest RSSI or RCPI, thereby ensuring that wireless connection 1210 is established to between the mobile device and the closest proximate management system.

Figure 13:
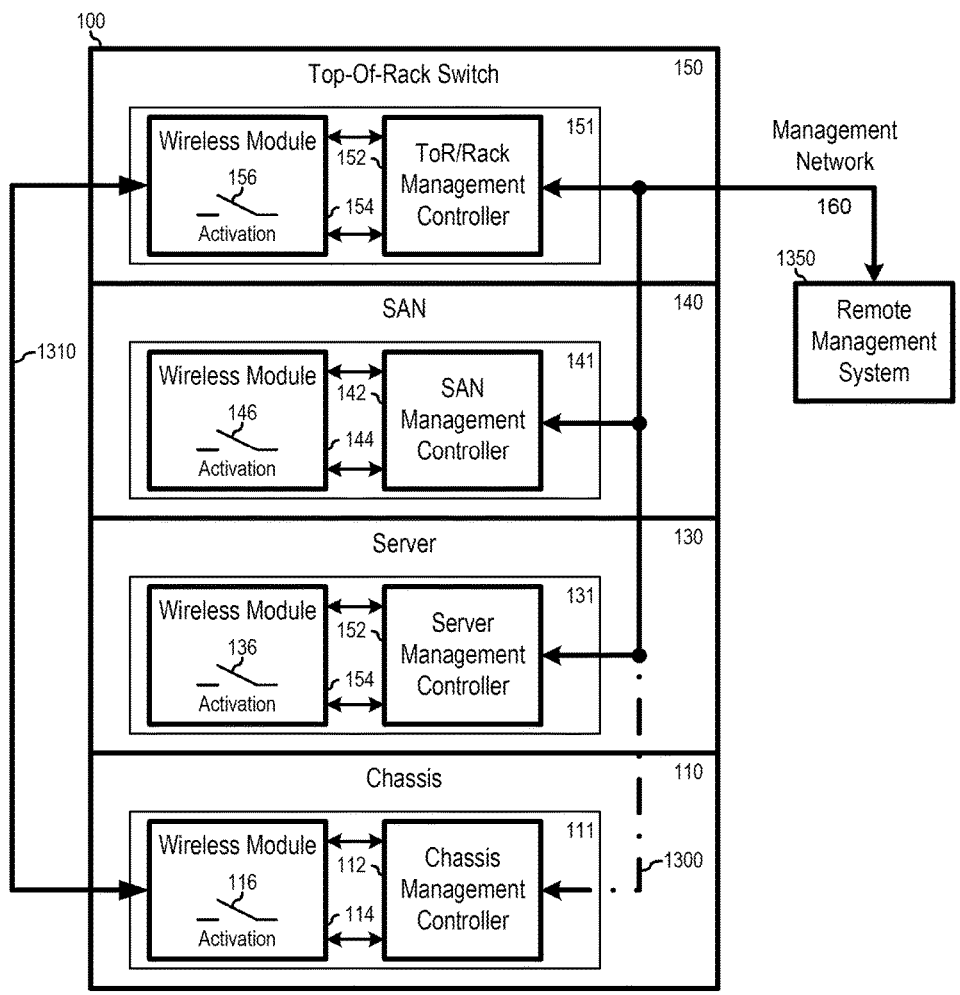

FIG. 13 illustrates an embodiment for establishing a management network on server rack 100 of FIG. 1, and for providing wireless failover of management connections in the server rack. Here, a remote management system 1350 is connected to management network 160 to provide out-of-band management of the elements of server rack 100. As such, remote management system 1350 can represent a management console or system that provides for remote management access to multiple server racks in a data center. Thus, remote management system 1350 has a wired connection to chassis management controller 111, to server management controller 131, to SAN management controller 141, and to ToR management controller 151. The wired connection can include a connection through a switch or router, and management network 160 can thus represent a switched fabric.

At some point in time after being connected to chassis management controller 111, a wired connection 1300 is broken, as indicated by the dashed line. For example, a port in a switch or router that provides management network 160 to chassis management controller 111 can drop the connection to the chassis management controller, a port of the chassis management controller can drop the connection to the management network, a technician can inadvertently disconnect the chassis management controller from the management network, or the like.

Here, in a particular embodiment, remote management system 1350 detects the loss of wired connection 1300, and the remote management system provides an indication to ToR management controller 152 that the wired connection has been lost. When ToR management controller 152 receives the indication that wired connection 1300 has been lost, the management controller directs wireless management module 154 to establish a wireless connection 1310 with wireless management module 114, and ToR management system 151 stands as proxy for communications between remote management system 1350 and chassis management system 111 via wireless connection 1310. In particular, wireless management module 154 provides a proxy connection beacon that includes device identification or model information that is associated with remote management system 1350, and indicating that ToR management system 151 is providing the connection beacon as proxy for the remote management system. In a particular embodiment, when wireless management module 114 receives the proxy connection beacon, the wireless management module can be authenticated onto ToR management system 151 as described above with respect to FIG. 10.

In another embodiment, rather than maintaining ToR management module 151 as a default element for establishing a wireless connection, a management system that is in closest proximity to chassis 110 operates to establish a wireless connection, and to stand as proxy for communications between the remote management system 1350 and chassis management system 111.

Figure 8:
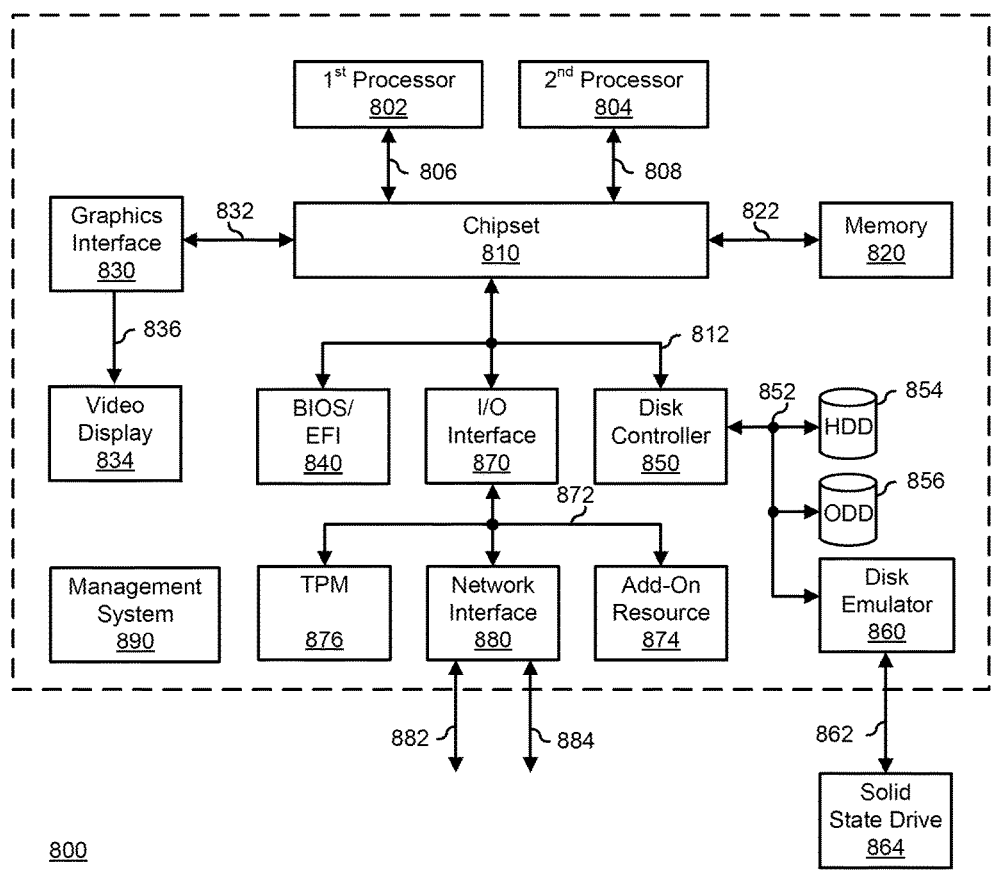
FIG. 8 is a block diagram illustrating a generalized information handling system according to an embodiment of the present disclosure.

FIG. 8 illustrates a generalized embodiment of information handling system 800. For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described above, and operates to perform one or more of the methods described above. Information handling system 800 includes a processors 802 and 804, a chipset 810, a memory 820, a graphics interface 830, include a basic input and output system/extensible firmware interface (BIOS/EFI) module 840, a disk controller 850, a disk emulator 860, an input/output (I/O) interface 870, a network interface 880, and a management system 890. Processor 802 is connected to chipset 810 via processor interface 806, and processor 804 is connected to the chipset via processor interface 808. Memory 820 is connected to chipset 810 via a memory bus 822. Graphics interface 830 is connected to chipset 810 via a graphics interface 832, and provides a video display output 836 to a video display 834. In a particular embodiment, information handling system 800 includes separate memories that are dedicated to each of processors 802 and 804 via separate memory interfaces. An example of memory 820 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 840, disk controller 850, and I/O interface 870 are connected to chipset 810 via an I/O channel 812. An example of I/O channel 812 includes a Peripheral Component Interconnect (PCI) interface, a PCI-Extended (PCI-X) interface, a high speed PCI-Express (PCIe) interface, another industry standard or proprietary communication interface, or a combination thereof. Chipset 810 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 840 includes BIOS/EFI code operable to detect resources within information handling system 800, to provide drivers for the resources, initialize the resources, and access the resources. BIOS/EFI module 840 includes code that operates to detect resources within information handling system 800, to provide drivers for the resources, to initialize the resources, and to access the resources.

Disk controller 850 includes a disk interface 852 that connects the disc controller to a hard disk drive (HDD) 854, to an optical disk drive (ODD) 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits a solid-state drive 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O interface 870 includes a peripheral interface 872 that connects the I/O interface to an add-on resource 874, to a TPM 876, and to network interface 880. Peripheral interface 872 can be the same type of interface as I/O channel 812, or can be a different type of interface. As such, I/O interface 870 extends the capacity of I/O channel 812 when peripheral interface 872 and the I/O channel are of the same type, and the I/O interface translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as chipset 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management system 890 provides for out-of-band monitoring, management, and control of the respective elements of information handling system 800, such as cooling fan speed control, power supply management, hot-swap and hot-plug management, firmware management and update management for system BIOS or UEFI, Option ROM, device firmware, and the like, or other system management and control functions as needed or desired. As such, management system 890 provides some or all of the functions and features of the management systems, management controllers, embedded controllers, or other embedded devices or systems, as described herein.

Figure 9:
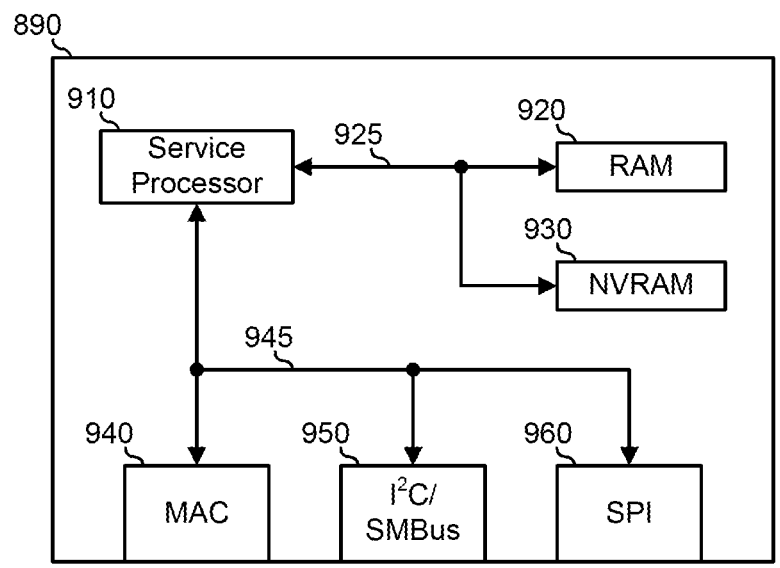
FIG. 9 is a block diagram illustrating an embodiment of a management system of the information handling system of FIG. 8.

FIG. 9 illustrates an embodiment of management system 890, including a service processor 910, a random-access memory (RAM) 920, an NVRAM 930, a media access control interface (MAC) 940, an I²C/SMBus interface 950, and an SPI interface 960. RAM 920 and NVRAM 930 are connected to service processor 910 through a memory bus 925. MAC 940, I²C/SMBus interface 950, and SPI interface 960 are connected to service processor 910 through an I/O bus 945. Management system 890 functions as a separate microcontroller system in information handling system 800, providing a dedicated management channel for maintenance and control of resources in the information handling system. As such, the resources in information handling system 800 are connected to one or more of I²C/SMBus interface 950, and SPI interface 960, permitting management system 890 to receive information from or send information to the resources. A management system can be connected to management system 890 via MAC 940, thereby permitting the management system to receive information from or send information to the management system for out-of-band management of information handling system 800. An example of MAC 940 includes an Ethernet standard interface, such as a reduced media independent interface (RMII), a network communication service interface (NC-SI), another network standard interface, or any combination thereof.

In a particular embodiment, management system 890 is included on a main circuit board (e.g., a baseboard, a motherboard, or any combination thereof) of information handling system 800, integrated onto another element of the information handling system such as chipset 810, or another suitable element, as needed or desired. As such, management system 890 can be part of an integrated circuit or a chip set within information handling system 800. An example of management system 890 includes a baseboard management controller (BMC), an integrated Dell remote access controller (iDRAC), another controller, or any combination thereof. Management system 890 can also operate on a separate power plane from other resources in information handling system 800. Thus management system 890 can communicate with a management system while the resources of information handling system 800 are powered off. Here, information can be sent from the management system to management system 890 and the information is stored in RAM 920 or NVRAM 930. Information stored in RAM 920 may be lost after power-down of the power plane for management system 890, while information stored in NVRAM 930 may be saved through a power-down/power-up cycle of the power plane for the micro controller.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server rack, comprising:
a first component including a host processor to provide a hosted environment, and also including a first management system to provide a managed environment separate from the hosted environment, to establish a first wireless connection to a mobile device, to process a first management request from the mobile device in the managed environment, and to detect that the first wireless connection has unexpectedly terminated; and
a second component including a second management system to receive an indication from the first management system that the first wireless connection was unexpectedly terminated, to establish a second wireless connection to the mobile device in response to the indication, to receive a second management request from the mobile device, and to send the second management request to the first management system;
the first management system being further to process the second management request in the managed environment.

2. The server rack of claim 1, wherein the first management system includes a first wireless management module to establish the first wireless connection to the mobile device.

3. The server rack of claim 2, wherein in establishing the first wireless connection, the first wireless management module is further to authenticate the mobile device.

4. The server rack of claim 3, wherein in authenticating the mobile device, the first wireless management module is further to establish a shared secret to encrypt communications on the first wireless connection.

5. The server rack of claim 4, wherein the second management system includes a second wireless management module to establish the second wireless connection to the mobile device.

6. The server rack of claim 5, wherein in establishing the second wireless connection, the second wireless management module encrypts communications on the second wireless connection using the shared secret.

7. The server rack of claim 1, wherein the first management system includes a first management controller coupled to the first wireless management module and the second management system includes a second management controller coupled to the second wireless management module and coupled to the first management controller via a management network.

8. The server rack of claim 1, wherein the second management system receives the indication in response to the second component being a pre-determined failover component.

9. The server rack of claim 1, wherein the second management system receives the indication in response to a wireless management module of the second management system being a closest proximate wireless management module of a plurality of wireless management modules to the first component.

10. A method, comprising:
providing a hosted environment on a processor of a first component of a server rack;
providing a managed environment on a first management system of the first component, wherein the managed environment is separate from the hosted environment;
establishing, on the first management system, a first wireless connection to a mobile device;
processing a first management request from the mobile device in the managed environment;
detecting that the first wireless connection has unexpectedly terminated;
receiving, at a second management system of a second component of the server rack, an indication from the first management system that the first wireless connection was unexpectedly terminated;
establishing, on the second management system, a second wireless connection to the mobile device in response to the indication;
receiving, at the second management system, a second management request from the mobile device;
sending the second management request to the first management system; and
processing the second management request in the managed environment.

11. The method of claim 10, further comprising:
establishing, by a first wireless management module of the first management system, the first wireless connection to the mobile device.

12. The method of claim 11, wherein in establishing the first wireless connection, the method further comprises:

authenticating, by the first wireless management module, the mobile device.

13. The method of claim 12, wherein in authenticating the mobile device, the method further comprises:
establishing, by the first wireless management module, a shared secret; and
encrypting, using the shared secret, communications on the first wireless connection.

14. The method of claim 13, further comprising:
establishing, by a second wireless management module of the second management system, the second wireless connection to the mobile device.

15. The method of claim 14, wherein in establishing the second wireless connection, the method further comprises:
encrypting, by the second wireless management module, communications on the second wireless connection using the shared secret.

16. The method of claim 10, further comprising:
coupling a first management controller of the first management system to the first wireless management module;
coupling a second management controller of the second management system to the second wireless management module; and
coupling the first management controller to the second management controller via a management network.

17. The method of claim 10, further comprising:
receiving, by the second management system, the indication in response to the second component being a pre-determined failover component.

18. The method of claim 10, further comprising:
receiving, by the second management system, the indication in response to a wireless management module of the second management system being a closest proximate wireless management module of a plurality of wireless management modules to the first component.

19. A non-transitory computer-readable medium including code for performing a method, the method comprising:
providing a hosted environment on a processor of a first component of a server rack;
providing a managed environment on a first management system of the first component, wherein the managed environment is separate from the hosted environment;
establishing, on the first management system, a first wireless connection to a mobile device;
processing a first management request from the mobile device in the managed environment;
detecting that the first wireless connection has unexpectedly terminated;
receiving, at a second management system of a second component of the server rack, an indication from the first management system that the first wireless connection was unexpectedly terminated;
establishing, on the second management system, a second wireless connection to the mobile device in response to the indication;
receiving, at the second management system, a second management request from the mobile device;
sending the second management request to the first management system; and
processing the second management request in the managed environment.

20. The computer-readable medium of claim 19, the method further comprising:
receiving, by the second management system, the indication in response to a wireless management module of the second management system being a closest proximate wireless management module of a plurality of wireless management modules to the first component.

* * * * *